US007798177B1

(12) United States Patent
Blair et al.

(10) Patent No.: US 7,798,177 B1
(45) Date of Patent: Sep. 21, 2010

(54) REMOVABLE TRANSITION SLEEVE FOR A TRANSITION TUBE OF A VACUUM SWEEPER

(75) Inventors: Gregory W. Blair, Russell, PA (US);
 Shawn M. Beltz, Warren, PA (US);
 Timothy W. Rowles, Warren, PA (US);
 Charles Embrey, Clarendon, PA (US)

(73) Assignee: Superior Tire & Rubber Corporation, Warren, PA (US)

( * ) Notice: Subject to any disclaimer, the term of this patent is extended or adjusted under 35 U.S.C. 154(b) by 1021 days.

(21) Appl. No.: 11/470,908

(22) Filed: Sep. 7, 2006

(51) Int. Cl.
*F16L 9/22* (2006.01)

(52) U.S. Cl. .................. 138/155; 138/109; 138/114; 15/340.1; 285/921

(58) Field of Classification Search ............. 138/109, 138/155, 120; 285/307, 921; 15/340.1
See application file for complete search history.

(56) References Cited

U.S. PATENT DOCUMENTS

| 3,749,021 | A | * | 7/1973 | Burgess ................. 102/467 |
| 4,128,189 | A | * | 12/1978 | Baxter .................. 222/109 |
| 4,354,624 | A | * | 10/1982 | Chowdhury et al. ........ 222/608 |
| 4,580,312 | A | | 4/1986 | Van Raaij |
| 4,600,131 | A | * | 7/1986 | Roof et al. .................. 222/478 |
| 5,076,309 | A | * | 12/1991 | Cornwall ................. 137/15.08 |
| 5,383,246 | A | | 1/1995 | Hagen |
| 5,649,662 | A | * | 7/1997 | Krichau et al. ............. 228/128 |
| 5,713,608 | A | * | 2/1998 | Yang ....................... 285/149.1 |
| 5,839,157 | A | | 11/1998 | Strauser et al. |
| 6,158,082 | A | * | 12/2000 | Beckey et al. ................. 15/326 |
| 6,444,003 | B1 | | 9/2002 | Sutcliffe |
| 7,546,852 | B1 | * | 6/2009 | Fails et al. ................... 138/109 |

* cited by examiner

*Primary Examiner*—Patrick F Brinson
(74) *Attorney, Agent, or Firm*—Lathrop & Clark LLP

(57) ABSTRACT

A transition sleeve is inserted into a transition tube of a vacuum system of a vacuum sweeper. The transition sleeve extends the useful life of the transition tube by sacrificially wearing instead of the transition tube. Such wear arises from abrasive grit and other materials swept up by the vacuum sweeper. The transition sleeve is desirably formed using wear-resistant materials. The transition sleeve can include a flange at one end to allow the transition sleeve to be held in the transition tube without using fasteners or bonding agents. A first portion of an interconnection structure is provided at the other end of the transition sleeve and engages with a second portion of the interconnection structure provided at a first end of an extension sleeve to connect the extension sleeve to the transition sleeve. The extension sleeve allows the transition sleeve to be used with transition tubes of varying lengths.

21 Claims, 7 Drawing Sheets

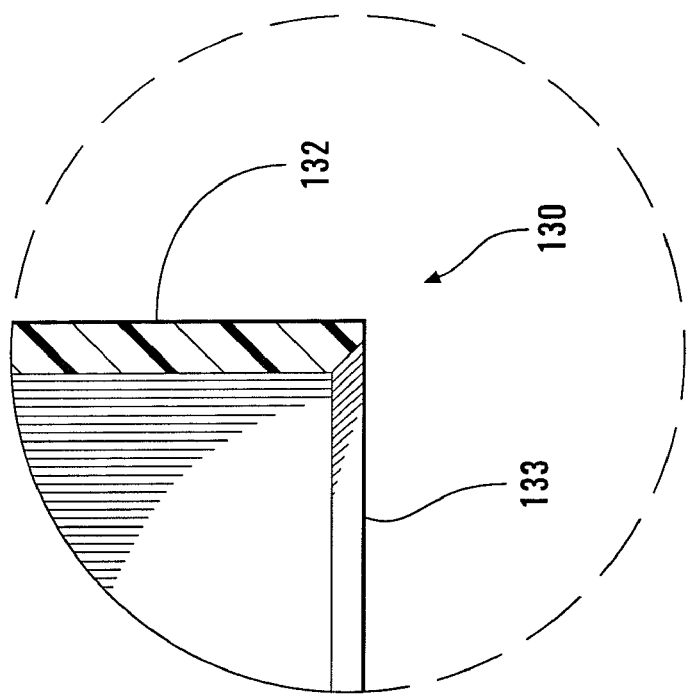
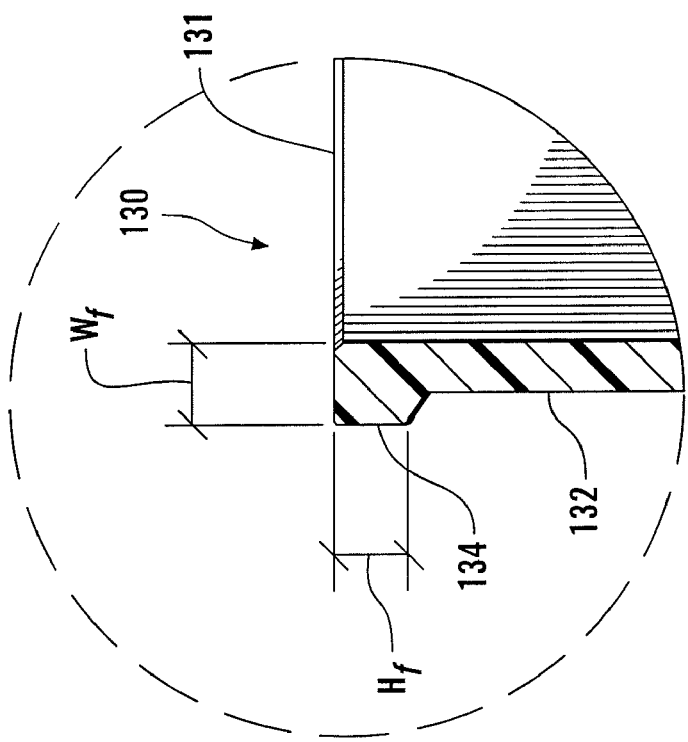
FIG. 5
FIG. 4

REMOVABLE TRANSITION SLEEVE FOR A TRANSITION TUBE OF A VACUUM SWEEPER

BACKGROUND OF THE INVENTION

1. Field of the Invention

This invention relates to vacuum-type street sweepers.

2. Related Art

Vacuum sweepers, especially those used for parking lots and on roadways and sidewalks, are well known in the industry. Various types of vacuum sweepers, from commercial units to small personal units, are manufactured by a number of companies, including Elgin Sweeper Company (e.g., Geo-Vac), Schwarze Industries (e.g., A-series, EV-series, M-series and S-series), Python Manufacturing, Inc. (e.g., Raven 45), and Tymco Inc. (e.g., Models 210, 435, OST-4, 600, OST-6, and 600 HSP). Typically, vacuum sweepers include transition tubes, such as air flow transition tubes, air intake tubes and hopper tubes, that help facilitate moving the swept material from one or more vacuum heads into a hopper.

Conventionally, these transition tubes are typically constructed of metals, including steel, steel alloys or aluminum, and various polymers. Transition tubes are subject to a great deal of wear and tear due to the impact and abrasion that occurs as the vacuumed particles and other fluent materials move through the transition tubes from the vacuum heads into the hopper.

SUMMARY OF THE INVENTION

The typical useful lifetime of most metal transition tubes is approximately 160 hours to 300 hours. After such periods of use, the frictional and corrosive wear caused by the interaction between the vacuumed particles and the interior of the transition tubes causes the metal transition tubes to wear and become unstable. Near or at the end of their useful life, transition tubes must be replaced or repaired.

Attempts to extend the useful lifetimes of these transition tubes have included using metal sleeve inserts that are inserted into the transition tubes to ameliorate the abrasive conditions experienced by transition tubes during use. Metal sleeve inserts have a number of disadvantages. Like the metal transition tubes, they are designed to protect, the metal sleeve inserts quickly wear out. The typical useful life of a metal sleeve insert is approximately 160 to 300 hours. In addition, removing and replacing worn metal sleeve inserts may be very difficult. Such metal sleeve inserts are typically worn and misshapen as a result of the abrasive and damaging conditions caused by the abrasive material passing through them. In addition, metal sleeve inserts are typically bolted or otherwise fastened to a transition tube in order to maintain the metal insert within the transition tube. However, the fasteners used to secure the metal sleeve inserts in the transition tubes are subject to the same corrosive, abrasive and destructive conditions resulting from the swept material. As such, the fasteners typically wear out quickly and need to be replaced often. In addition, the metal sleeve inserts are themselves significantly expensive to replace.

Other attempts to increase the useful life of transition tubes include affixing or molding elastomers, such as rubber or polyurethane, to the transition tubes using fasteners such as screws and/or bonding agents such as glue. However, as discussed above, the abrasive material passing through the transition tubes typically takes little time to destroy or damage the fastener heads, causing the elastomers to slip or move inside the transition tubes. Using bonding agents to affix the elastomers to the transition tubes also has disadvantages. It is very difficult to seamlessly glue elastomers to transition tubes. For example, the bonding agents and elastomers commonly experience different thermal expansion characteristics, which causes stress and cracks that allow the swept abrasive material to attack and destroy the bond between the elastomer and the transition tube. Furthermore, bolting or gluing the elastomers to the transition tubes is labor intensive and makes it difficult to make field repairs to the transition tubes.

Furthermore, an affixed or molded elastomer typically does not wear evenly. As a result, certain portions of the elastomer wear out before other portions, making it difficult to replace the elastomer liner as it wears or to otherwise service the transition tube without replacing the transition tube in its entirety. Furthermore, once a section of elastomer is compromised, the steel previously covered by that section of elastomer is exposed and subject to wear. Ultimately, the transition tube will fail and need to be replaced in its entirety. As discussed above, this replacement is costly and time consuming. Further, replacing these molded transition tubes is often more costly than replacing a typical metal transition tube.

This invention provides an inner protective barrier for a transition tube.

This invention separately provides an interior protective barrier for a transition tube that is installed, serviced and/or replaced with little difficulty, downtime and/or expense.

This invention separately provides an inner protective barrier for a transition tube that is relatively resistant to wear compared to conventional transition tubes and inserts for transition tubes.

This invention separately provides an inner protective barrier that is easily secured to the transition tube.

This invention separately provides an inner protective barrier that can be secured to a transition tube without having to fasten or bond the inner protective barrier to the transition tube.

This invention separately provides an inner protective barrier that can be easily rotated or otherwise adjusted to increase its useful lifetime and improve its effectiveness.

This invention separately provides an inner protective barrier that may be interlocked with at least one extension sleeve to extend the overall length of the protective barrier.

This invention separately provides a long-life inner protective barrier for a transition tube that is relatively inexpensive to manufacture.

In various exemplary embodiments, the transition tube comprises a cylindrical sleeve body having a longitudinal opening passing through the sleeve body and a flange at one end of the transition tube. The cylindrical sleeve forms an easily installed, maintained and replaced protective barrier that is removably retained within the transition tube without requiring the use of individual fasteners or bonding agents. In one embodiment, the transition sleeve may be engaged with at least one extension sleeve to extend the overall length of the transition sleeve.

These and other features and advantages of various exemplary embodiments of the apparatus according to this invention are described in, or are apparent from, the following detailed description of various exemplary embodiments of various devices, and/or structures according to this invention.

BRIEF DESCRIPTION OF DRAWINGS

Various exemplary embodiments of the systems according to this invention will be described in detail, with reference to the following figures, wherein:

FIG. 4 is a cross-sectional view showing in greater detail one exemplary embodiment of a first end and a flange of a transition sleeve according to this invention;

FIG. 5 is a cross-sectional view of one exemplary embodiment of a second end of a transition sleeve according to this invention;

DETAILED DESCRIPTION OF EXEMPLARY EMBODIMENTS

Figure 1:
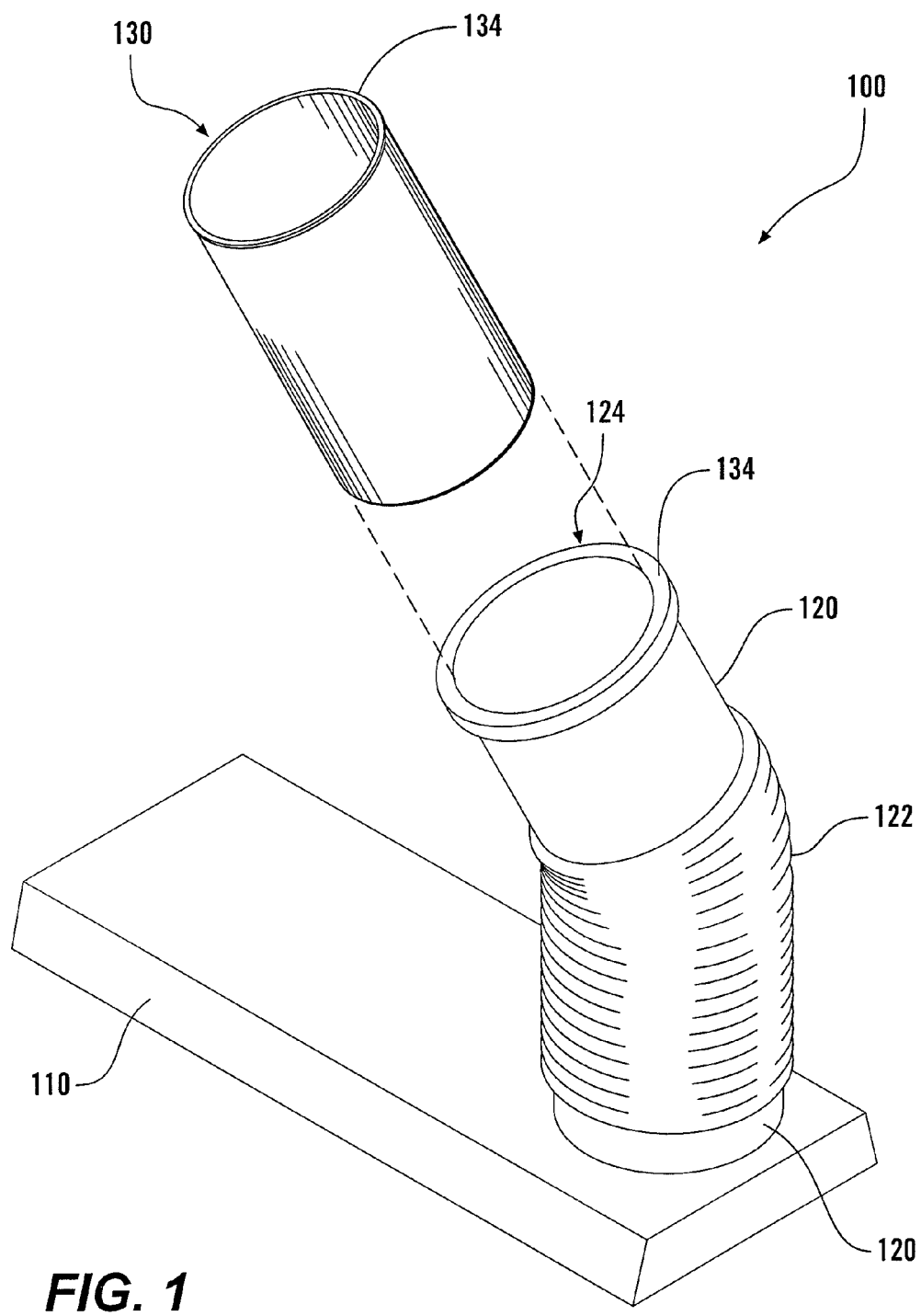
FIG. 1 is a perspective view of a vacuum head assembly that includes one exemplary embodiment of a transition sleeve according to this invention.

This vacuum sweeper transition sleeve may be inserted into a transition tube such as an air flow transition tube, an air intake tube, a hopper tube and the like to prolong the life of the transition tube. FIG. 1 is a perspective view of a typical vacuum head assembly 100 for a vacuum sweeper and a first exemplary embodiment of a transition sleeve according to this invention. A transition tube 120 of the vacuum head assembly 100 helps move swept and other fluent material from the vacuum head 110 to a collection system, such as a hopper. Some transition tubes 120, such as an air flow transition tube or an air intake tube, are typically coupled to the vacuum head 110 by a flexible conduit 122. Other transition tubes, such as a hopper tube, are connected to a hopper of the vacuum sweeper. The vacuum head assembly 100 connections may not be direct. For example, the vacuum head assembly 100 may also include a number of gaskets engaged throughout the vacuum head assembly 100 to provide a seal between the vacuum head 110, the flexible conduit 122, the transition tubes 120 and the hopper. In one exemplary embodiment, a transition sleeve 130 may be inserted into the transition tube 120 to extend the life of the transition tube 120.

Figure 2:
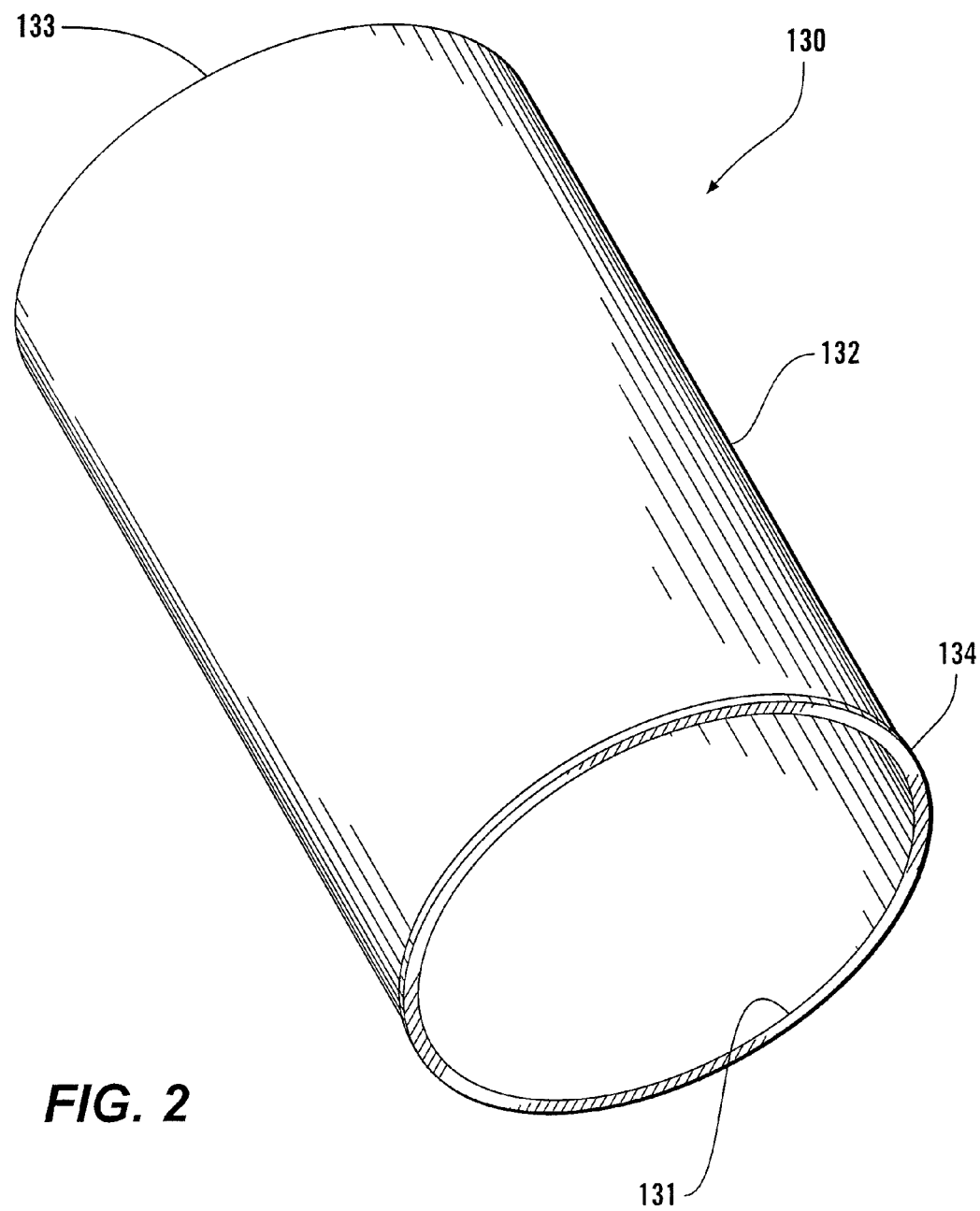
FIG. 2 is a perspective view showing the transition sleeve of FIG. 1 in greater detail.

FIG. 2 is a perspective view showing in greater detail one exemplary embodiment of the transition sleeve 130 shown in FIG. 1. In the exemplary embodiment shown in FIG. 2, the transition sleeve 130 comprises a generally cylindrical or tubular sleeve body 132 having a longitudinal opening or passageway. In various exemplary embodiments, the transition sleeve 130 has a first end 131 and a second end 133. In various exemplary embodiments, at least the first end 131 of the transition sleeve 130 has a flange 134. In various exemplary embodiments, the flange 134 may extend along the entire circumference of the first end 131 of the transition sleeve 130. The transition sleeve 130 can be formed using various abrasion resistant materials. Such materials include one or more of rubber and polymers, such as polyethylene and particularly ultra-high molecular weight polyethylene, polypropylene, polyurethane, nylon, acrylics or acrylics with embedded fibers. If nylon is used, nylon 6, nylon 6-6 and nylon 11 can be used. Any of these materials may be 100% virgin or may incorporate up to 100% of recycled material. However, it should be appreciated that any material that provides sufficient abrasion resistance can be used to form the transition sleeve 130.

In various exemplary embodiments, the flange 134 is made of the same material as the sleeve body 132. In various other exemplary embodiments, the flange 134 is made of a similar material such as a polymer, but can be made of a distinct or different material. However, any appropriate material, such as a polymer, or combination of such materials, may be used to construct the sleeve body 132 and/or the flange 134. These materials include, but are not restricted to, rubber, polyethylene, polypropylene, polyurethane, nylon, acrylic and acrylic with embedded fibers. If nylon is used, nylon 6, nylon 6-6 or nylon 11 can be used. In addition, in various exemplary embodiments, the sleeve body 132 and/or the flange 134 may comprise a co-extrusion that combines two or more layers of various extrudable materials, such as resins, to form one composite material. Using such materials for the transition sleeve 130 can extend the life of a transition tube such that the transition tube itself may never need to be replaced or repaired when the transition sleeve 130 is inserted into the transition tube.

In various exemplary embodiments, the material used to form the transition sleeve 130 has a Shore hardness in the range of about 50 A to about 70 D. In various exemplary embodiments, the material used to form the transition sleeve 130 has a hardness in the range of about 83 to about 87 durometer Shore A hardness. In various exemplary embodiments, the material used to form the transition sleeve 130 has a hardness of about 90 to about 93 durometer Shore A hardness. In various exemplary embodiments, the material used to form the sleeve body 132 and/or the flange 134 is desirably soft enough that the sleeve body 132 and/or the flange 134 can be squeezed and/or collapsed for ease of installation into a transition tube.

In various exemplary embodiments, the transition sleeve 130 is generally cylindrical in shape. It should be appreciated, however, that the transition sleeve 130 may be any shape that is appropriate for a given transition tube. It should also be appreciated that the flange 134 need not be cylindrical in shape. The flange 134 may take any shape appropriate to fit a particular transition tube. Furthermore, while in various exemplary embodiments, the flange 134 and the sleeve body 132 may have similar cross-sectional shapes and/or inner and/or outer contours, the flange 134 need not use the same contour as the sleeve body 132. For example, Tymco, Inc. has manufactured a street sweeper having a transition tube that comprises a tube body that is generally cylindrical in shape but transitions to a square head. In various exemplary embodiments, a transition sleeve 130 having a cylindrical sleeve body 132 with a square-shaped flange 134 is particularly useful for such a transition tube.

In various exemplary embodiments, the outer diameter of the flange 134 and the length and outer diameter of the sleeve body 132 depend on the type and dimensions of the particular transition tube a particular transition sleeve 130 is adapted to fit. In various exemplary embodiments, the overall length of the transition sleeve 130 is from about 10 inches to about 14 inches and the diameter of the exterior of the sleeve body 132 is about 8 inches to about 11 inches. In some exemplary embodiments, the overall length of the sleeve body 132 is approximately about 12 inches and the outer diameter of the sleeve body 132 is approximately about 9.5 inches. In various exemplary embodiments, the sleeve body 132 has a substantially uniform thickness, which is, in various exemplary embodiments, about 0.20 inches to about 0.35 inches thick. However, it should be appreciated that the sleeve body 132 may be any length and/or thickness that may be suitable for use with a particular transition tube.

In various exemplary embodiments, the flange 134 and the sleeve body 132 are molded together or otherwise integrally formed. In various exemplary embodiments, the transition sleeve 130, including the flange 134, is manufactured using open cast molding. In various other exemplary embodiments, the transition sleeve 130 is extruded. When injection-molded, the transition sleeve 130 is formed using injection molded or spin cast plastic, such as ultra-high molecular weight polyethylene. It should be appreciated, that, in various exemplary embodiments, the flange 134 and the sleeve body 132 are formed as separate parts and connected, affixed or bonded together using epoxy, glue and/or the like, or any known or later-developed agents and/or methods.

Figure 3:
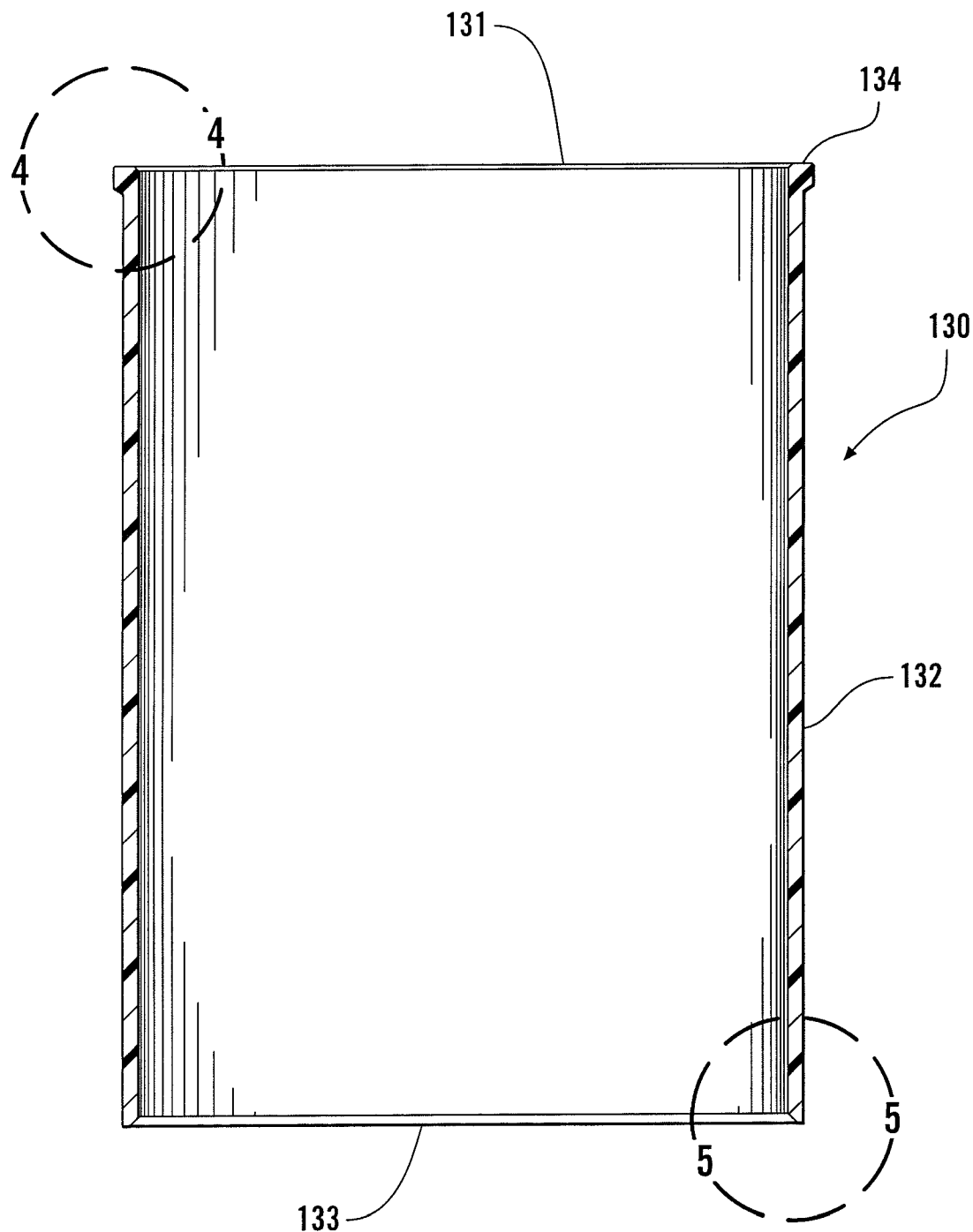
FIG. 3 is a cross-sectional view of the transition sleeve shown in FIG. 1.

As shown in FIGS. 3 and 4, the flange 134 extends outwardly from the outer surface of the sleeve body 132. In various exemplary embodiments, the width $W_f$ of the flange 134 ranges from about 0.25 inches to about 0.75 inches. These values, however, may vary depending on the particular materials that are used and/or when the dimensions of the transition tube allow or require.

In various exemplary embodiments, the height $H_f$ of the flange 134 ranges from about 0.12 inches to about 0.38 inches. These values may, however, may vary depending on the particular materials that are used and/or a number of other factors, including, for example, the weight of the particular transition sleeve 130, the dimensions of the transition tube, and the dimensions of any gaskets, seals and/or the like used near the end of the transition tube.

As shown in FIG. 4, in various exemplary embodiments, the surface of the flange 134 extending from the sleeve body 132 tapers away from the sleeve body 132 at a determined angle. In various exemplary embodiments, the determined angle of the taper of the flange 134 from the sleeve body 132 is about 0 degrees to about 30 degrees. In various exemplary embodiments, the interior or inner edge of the first end 131 of the sleeve body 132 of the transition sleeve 130 is beveled. In various exemplary embodiments, the angle of the bevel of the inner edge of the sleeve body 132 is about 30 degrees to about 60 degrees.

As shown in FIGS. 3 and 5, the second end 133 of the sleeve body 132 of the transition sleeve 130 may comprise any of a variety of shapes. In various exemplary embodiments, the inner edge of the second end 133 is substantially square. In various other exemplary embodiments, the inner edge of the second end 133 is beveled. A beveled edge can improve the flow of material past the inner edge of the second end 133 and/or reduce wear and tear on the transition sleeve 130.

It should be appreciated that the longitudinal length of the transition sleeve 130 will typically depend upon the type and dimensions of the particular transition tube 120 that the transition sleeve 130 is adapted to fit. In various exemplary embodiments, the transition sleeve 130 is manufactured at a particular length useable with a number of different types of known or later-developed transition tubes. If a transition sleeve 130 shorter than the standard manufactured length is desired, the transition sleeve 130 can be cut to remove the excess length. This allows the transition sleeve 130 to better fit a particular transition tube.

Figure 6:
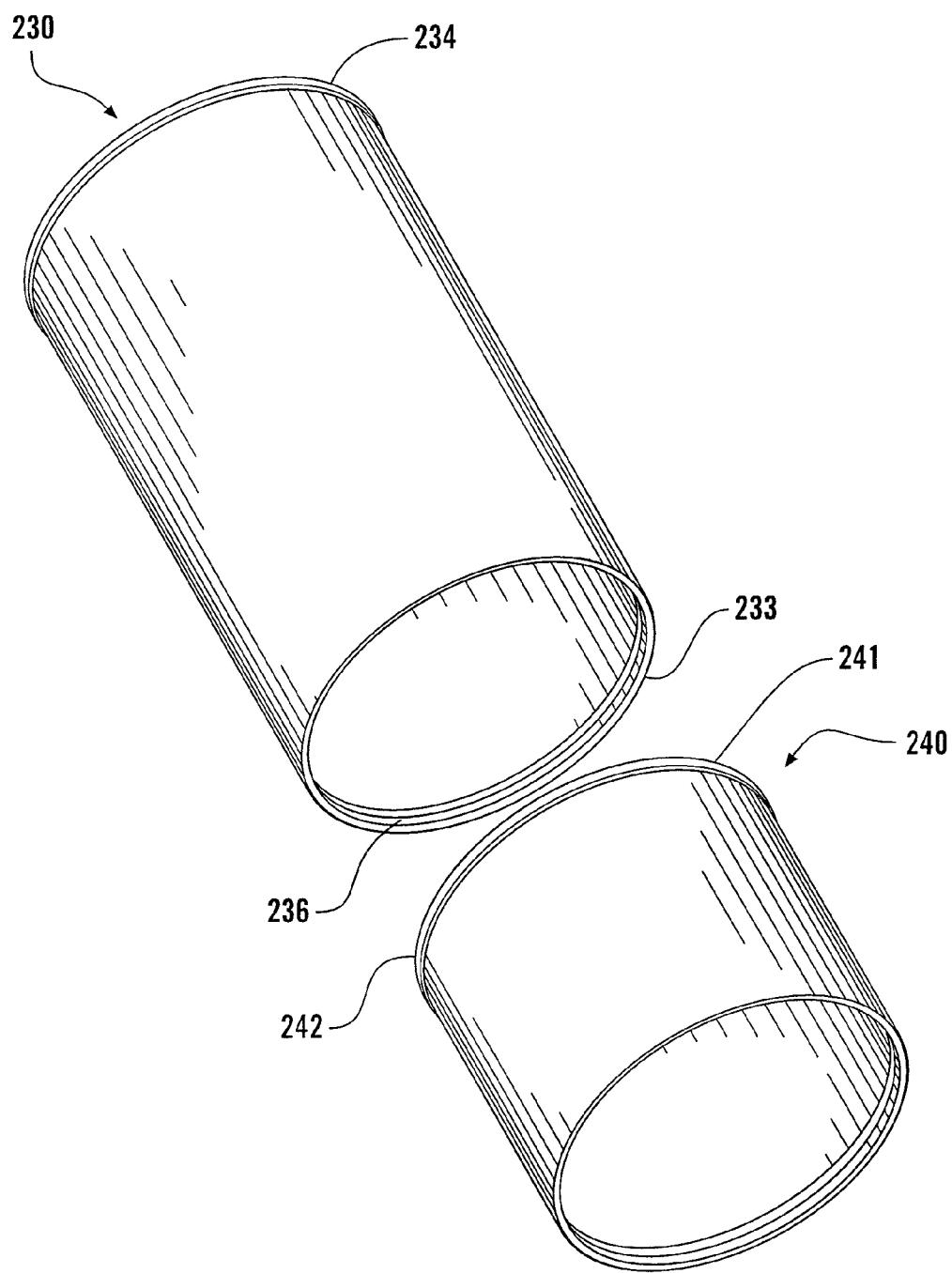
FIG. 6 is a perspective view of a second exemplary embodiment of a transition sleeve and a first exemplary embodiment of an extension sleeve according to this invention.

FIG. 6 shows a second exemplary embodiment of a transition sleeve 230 according to this invention. The exemplary embodiment of the transition sleeve 230 illustrated in FIG. 6 is particularly useful when a longer transition sleeve 230 is useful or desirable. As shown in FIG. 6, the transition sleeve 230 can be combined with at least one extension sleeve 240 to extend the overall length of the transition sleeve 230. Additional extension sleeves 240 can be added to the initial extension sleeve 240 connected to the transition sleeve 230 to provide a transition sleeve 230 having any desired additional length.

Figure 8:
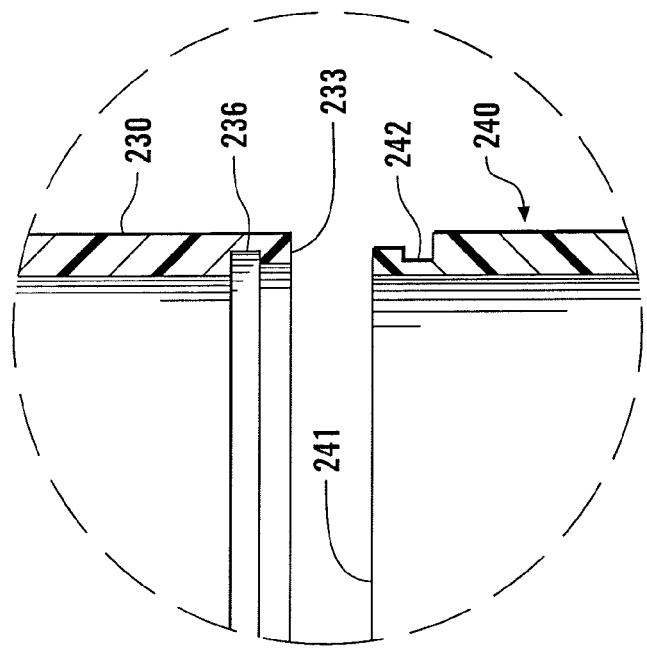
FIG. 8 is a cross-sectional view showing in greater detail the exemplary embodiment of the second end of the transition sleeve and the first end of the first exemplary extension sleeve shown in FIG. 7.
Figure 7:
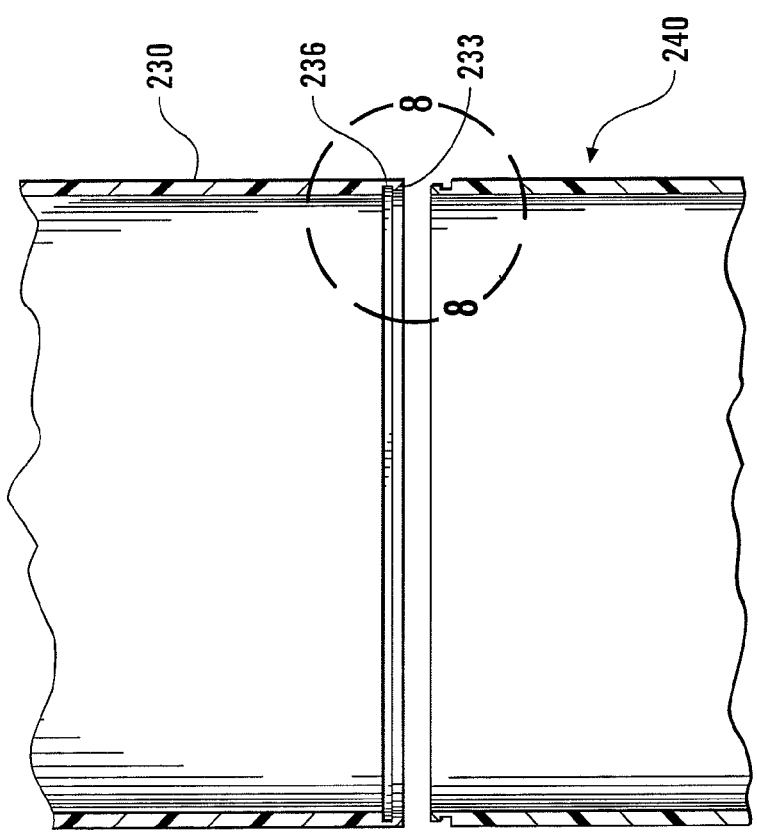
FIG. 7 is a cross-sectional view of an exemplary embodiment of a second end of the second exemplary transition sleeve and a first end of the first exemplary extension sleeve according to this invention.
Figure 9:
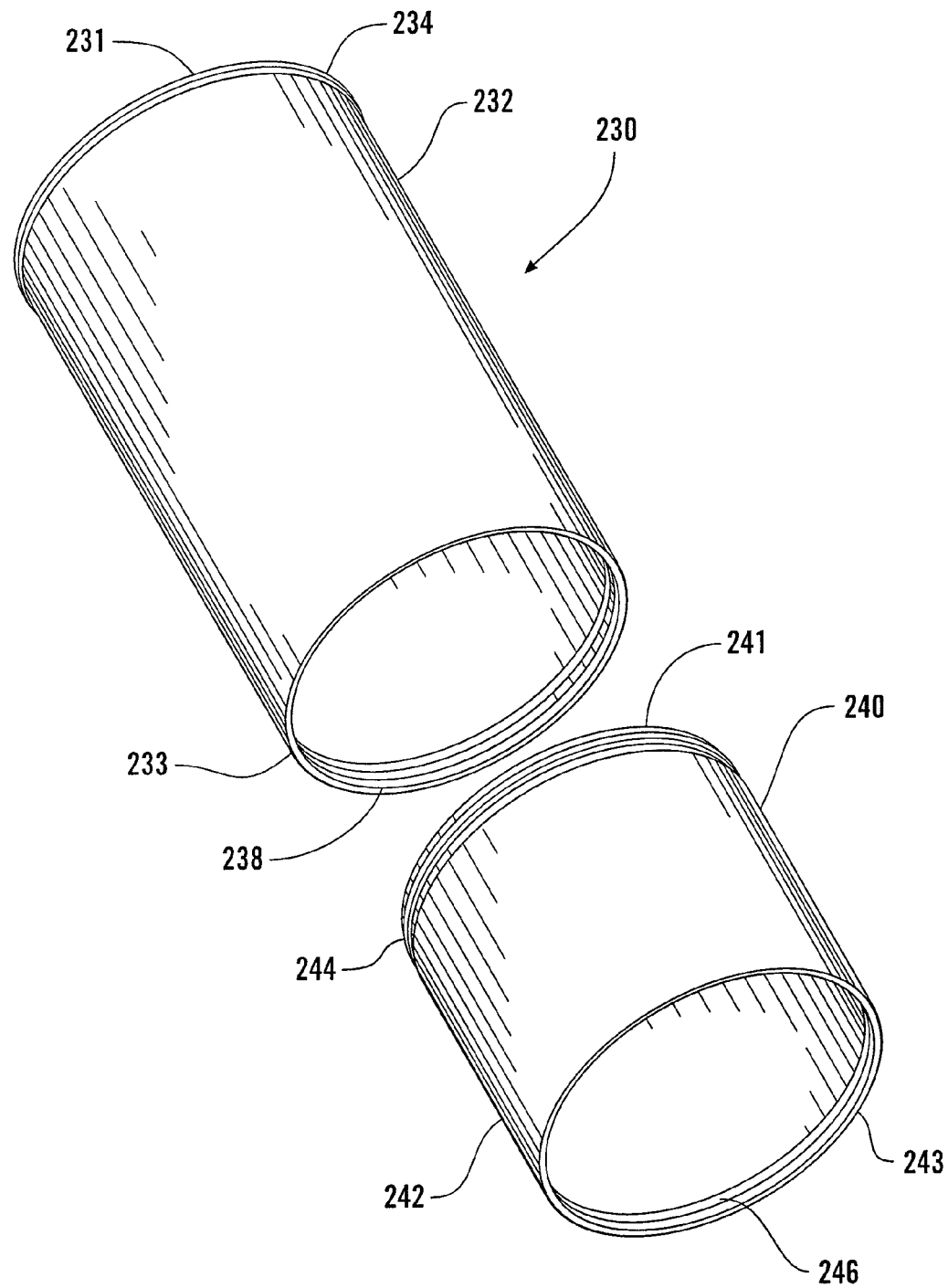
FIG. 9 is a perspective view of a second exemplary embodiment of a transition sleeve and a second exemplary embodiment of an extension sleeve according to this invention.

In the exemplary embodiments shown in FIGS. 6-8, the extension sleeve 240 is connected to the transition sleeve 230 using a groove structure 236 provided near the second end 233 of the transition sleeve 230 and a tongue structure 242 provided near a first end 241 of the extension sleeve 240. It should be appreciated that the tongue and groove structures 242 and 236 can be instead provided on the opposite one of the extension and transition sleeves 240 and 230, respectively. In operation, in one embodiment, the tongue structure 242 engages the groove structure 236 and interconnects the extension sleeve 240 with the transition sleeve 230 to help prevent movement of the extension sleeve 240 with respect to the transition sleeve 230. In other various exemplary embodiments, a keyhole structure is used to interlock an extension sleeve 240 to the transition sleeve 230. In the exemplary embodiment shown in FIG. 9, the inner side of the second end 233 of the transition sleeve 230 may be provided with internal threads 238, while the extension sleeve 240 is provided with corresponding external threads 244, such that the extension sleeve 240 can be simply screwed onto the transition sleeve 230.

In operation, a transition sleeve 130 or 230 according to this invention is inserted into a transition tube 120. In various exemplary embodiments, the transition sleeve 130 or 230 is orientated and aligned with the transition tube 120 and inserted into the transition tube 120 until the flange 134 or 234 abuts against a first edge of the transition tube 120. In various embodiments, the flange 134 or 234 extends between the end 124 of the transition tube 120 and another system member, such as the flexible conduit 122 or the hopper, so that it is securely held in place. Once secured, the flange 134 or 234 abutting against the end 124 of the transition tube 120 prevents the transition sleeve 130 or 230 from sliding or rotating. Various gaskets, seals and/or the like can be used with the flange 134 or 234 to create a better seal between the transition tube 120 and the vacuum head 110, the flexible conduit 122, and/or the hopper.

The flange 134 or 234 enables the transition sleeve 130 or 230 to be removably retained within a transition tube 120. That is, the flange 134 or 234 allows the transition sleeve 130 or 230 to be easily secured into position but also easily removed. The ability for a service person to easily insert and remove the transition sleeve 130 or 230 substantially reduces downtime and maintenance time. In addition, the relatively easily detachable transition sleeve 130 or 230 allows the transition sleeve 130 or 230 to be readily replaced in the field. Using the flange 134 or 234 to secure the transition sleeve 130 or 230 also allows the transition sleeve 130 or 230 to be easily rotated and re-secured in a new position. Certain areas of the transition sleeve 130 or 230 may wear faster than other areas. The useful life of the transition sleeve 130 or 230 may be substantially improved by rotating the transition sleeve 130 or 230 in the transition tube 120 and securing the transition sleeve 130 or 230 in a new position.

If desired, the transition sleeve 130 or 230 may be replaced by sliding the transition sleeve 130 or 230 out of the transition tube 120 and installing a new transition sleeve 130 or 230 into the transition tube 120, as previously described. Removing and replacing the transition sleeve 130 or 230 may take place as desired or needed due to any number of circumstances, such as the wear and tear on the transition sleeve 130 or 230 and/or transition tube 120, damage to the transition sleeve 130 or 230 and/or transition tube 120, and/or to facilitate the cleaning of the transition tube 120 and/or the transition sleeve 130 or 230.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments according to the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A transition sleeve securable within a transition tube of a vacuum sweeper, a first end of the transition tube connectable to a first portion of the vacuum sweeper, the transition sleeve comprising:
   a sleeve body; and
   a flange located at a first end of the sleeve body and extending outwardly from the sleeve body, wherein:
   when the transition sleeve is inserted into the first end of the transition tube, the sleeve body extends within the transition tube while the flange remains outside of and radially adjacent to the first end of the transition tube such that the flange is securable within the transition tube when the first end of the transition tube is connected to the first portion of the vacuum sweeper.

2. The transition sleeve of claim 1, wherein the sleeve body is formed from at least one of rubber, polyethylene, polypropylene, polyurethane, nylon, and acrylic with embedded fibers.

3. The transition sleeve of claim 1, wherein the sleeve body comprises at least one of nylon 6, nylon 6-6 and nylon 11.

4. The transition sleeve of claim 1, wherein the sleeve body comprises ultra high molecular weight polyethylene.

5. The transition sleeve of claim 1, wherein the flange comprises at least one of rubber, polyethylene, polypropylene, polyurethane, nylon, acrylic and acrylic with embedded fibers.

6. The transition sleeve of claim 1, wherein the flange comprises at least one of nylon 6, nylon 6-6 and nylon 11.

7. The transition sleeve of claim 1, wherein the flange comprises ultra high molecular weight polyethylene.

8. The transition sleeve of claim 1, further comprising an extension sleeve connectable to a second end of the sleeve body.

9. The transition sleeve of claim 8, wherein the extension sleeve comprises at least one material selected from the group consisting of rubber, polyethylene, polypropylene, polyurethane, nylon, acrylic and acrylic with embedded fibers.

10. The transition sleeve of claim 8, wherein the extension sleeve comprises at least one nylon selected from the group consisting of nylon 6, nylon 6-6 and nylon 11.

11. The transition sleeve of claim 8, wherein:
   a first end of the extension sleeve is connectable to the second end of the sleeve body;
   the second end of the sleeve body includes a first portion of an interconnection structure;
   the first end of the extension sleeve includes a second portion of the interconnection structure; and
   the first end of the extension sleeve is connectable to the second end of the sleeve body by engaging the first and second portions of the interconnection structure.

12. The transition sleeve of claim 11, wherein:
   the interconnection structure is a tongue and groove structure, where the first portion of the interconnection structure is one of a tongue portion and a groove portion and the second portion of the interconnection structure is the other of the tongue portion and the groove portion; and
   the first end of the extension sleeve is connectable to the second end of the sleeve body by engaging the tongue portion into the groove portion.

13. The transition sleeve of claim 11, wherein:
   the interconnection structure is a thread structure, where the first portion of the interconnection structure is one of an internal threaded portion having at least one set of internal threads and an external threaded portion having at least one set of external threads and the second portion of the interconnection structure is the other of the internal threaded portion having at least one set of internal threads and the external threaded portion having at least one set of external threads; and
   the extension sleeve is connectable to the sleeve body by screwing together the first end of the extension sleeve and the second end of the sleeve body using the at least one sets of internal and external threads.

14. The transition sleeve of claim 11, further comprising a second extension sleeve connectable to a second end of the first extension sleeve, wherein:
   a first end of the second extension sleeve is connectable to a second end of the first extension sleeve;
   the second end of the first extension sleeve includes one of the first portion and the second portion of the interconnection structure;
   the first end of the second extension sleeve includes the other of the first portion and the second portion of the interconnection structure; and
   the first end of the second extension sleeve is connectable to the second end of the first extension sleeve by engaging the first and second portions of the interconnection structure.

15. The transition sleeve of claim 14, wherein:
   the interconnection structure is a tongue and groove structure, where the first portion of the interconnection structure is one of a tongue portion and a groove portion and the second portion of the interconnection structure is the other of the tongue portion and the groove portion; and
   the first end of the second extension sleeve is connectable to the second end of the first extension sleeve by engaging the tongue portion into the groove portion.

16. The transition sleeve of claim 14, wherein:
   the interconnection structure is a thread structure, where the first portion of the interconnection structure is one of an internal threaded portion having at least one set of internal threads and an external threaded portion having at least one set of external threads and the second portion of the interconnection structure is the other of the internal threaded portion having at least one set of internal threads and the external threaded portion having at least one set of external threads; and
   the second extension sleeve is connectable to the first extension sleeve by screwing together the first end of the second extension sleeve and the second end of the first extension sleeve using the at least one sets of internal and external threads.

17. A transition sleeve assembly securable within a transition tube of a vacuum sweeper, comprising:

a sleeve body;

a flange located at a first end of the sleeve body and extending outwardly from the sleeve body, wherein, when the transition sleeve is inserted into the first end of the transition tube, the sleeve body extends within the transition tube while the flange remains outside of and radially adjacent to the first end of the transition tube; and an extension sleeve, a first end of the extension sleeve connectable to a second end of the sleeve body.

18. The transition sleeve assembly of claim 17, wherein:

the second end of the sleeve body includes a first portion of an interconnection structure;

the first end of the extension sleeve includes a second portion of the interconnection structure; and the first end of the extension sleeve is connectable to the second end of the sleeve body by engaging the first and second portions of the interconnection structure.

19. The transition sleeve assembly of claim 18, wherein:

the interconnection structure is a tongue and groove structure, where the first portion of the interconnection structure is one of a tongue portion and a groove portion and the second portion of the interconnection structure is the other of the tongue portion and the groove portion; and the first end of the extension sleeve is connectable to the second end of the sleeve body by engaging the tongue portion into the groove portion.

20. The transition sleeve assembly of claim 18, wherein:

the interconnection structure is a thread structure, where the first portion of the interconnection structure is one of an internal threaded portion having at least one set of internal threads and an external threaded portion having at least one set of external threads and the second portion of the interconnection structure is the other of the internal threaded portion having at least one set of internal threads and the external threaded portion having at least one set of external threads; and the extension sleeve is connectable to the sleeve body by screwing together the first end of the extension sleeve and the second end of the sleeve body using the at least one sets of internal and external threads.

21. The transition sleeve assembly of claim 18, further comprising a second extension sleeve connectable to a second end of the first extension sleeve, wherein:

a first end of the second extension sleeve is connectable to a second end of the first extension sleeve;

the second end of the first extension sleeve includes one of the first portion and the second portion of the interconnection structure;

the first end of the second extension sleeve includes the other of the first portion and the second portion of the interconnection structure; and the first end of the second extension sleeve is connectable to the second end of the first extension sleeve by engaging the first and second portions of the interconnection structure.

* * * * *